United States Patent [19]
Goldstein et al.

[11] Patent Number: 6,002,713
[45] Date of Patent: Dec. 14, 1999

[54] PCM MODEM EQUALIZER WITH ADAPTIVE COMPENSATION FOR ROBBED BIT SIGNALLING

[75] Inventors: Yuri Goldstein, Southbury; Val Maizenberg, Danbury; William Hanna, Wolcott, all of Conn.

[73] Assignee: PC Tel, Inc., Waterbury, Conn.

[21] Appl. No.: 08/955,756

[22] Filed: Oct. 22, 1997

[51] Int. Cl.[6] .............................. H04B 1/38; H04L 5/16
[52] U.S. Cl. ...................... 375/222; 375/232; 375/233; 708/323
[58] Field of Search .................... 375/222, 231, 375/232, 233; 364/724.2; 708/323

[56] References Cited

U.S. PATENT DOCUMENTS

| | | | |
|---|---|---|---|
| 5,311,545 | 5/1994 | Critchlow | 375/232 |
| 5,499,268 | 3/1996 | Takahashi | 375/232 |
| 5,517,524 | 5/1996 | Sato | 375/232 |
| 5,761,247 | 6/1998 | Betts et al. | 375/316 |
| 5,812,602 | 9/1998 | Humblet | 375/265 |

Primary Examiner—Don N. Vo
Attorney, Agent, or Firm—David P. Gordon; David S. Jacobson; Thomas A. Gallagher

[57] ABSTRACT

A PCM modem equalizer includes an RBS estimator and decision modulator in conjunction with an adaptive equalizer such as a conventional decision feedback equalizer (DFE). The RBS estimator and decision modulator receives error signals from the second summer in the equalizer, receives the estimated R signals from the first summer of the equalizer, and outputs a gain correction signal which is applied to the output of the reference generator before the reference generator output is applied to the feedback equalizer and the second summer. The methods of the invention are based on the recognition that the effects of RBS can be detected in the amplitude modulation of the main training sequence stream. The modulation will occur in a periodic repetitive pattern of length 6*T where T is the symbol interval. Therefore, the invention applies a corrective gain to the decision in each time slot in a periodic manner having the same period 6*T. For each time interval $T_k$ over a period of 6*T, the symbol present at the time interval is sampled and a respective corrective gain g(6k−j) is applied to it, where j has the values 0 through 5. The gain applied to each of the six time slots is adaptively updated over a training period until each of the six gain coefficients is optimized.

21 Claims, 8 Drawing Sheets

PCM MODEM EQUALIZER WITH ADAPTIVE COMPENSATION FOR ROBBED BIT SIGNALLING

BACKGROUND OF THE INVENTION

1. Field of the Invention

The present invention relates broadly to the field of telecommunications. More particularly, the present invention relates to a modem equalizer for a PCM modem where the modem equalizer will function properly in the presence of a robbed-bit signalling network.

2. State of the Art

With the ever-increasing importance of telecommunications for the transfer of data as well as voice, there has been a strong effort to increase data transfer rates over the telephone wires. Recently, the ITU-T adopted the V.34 Recommendation (International Telecommunication Union, Telecommunication Standardization Sector Recommendation V.34, Geneva, Switzerland 1994) which is hereby incorporated by reference herein in its entirety. The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, recently, there has been a thrust to provide additional standards recommendations which will increase data transfer rates even further (note the TIA TR-30.1 PCM Modem ad hoc group and the ITU-T Study Group 16).

Recognizing that further increases in data rates is theoretically limited (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend (which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation technology for upstream communications. As will be appreciated by those skilled in the art, the technologies underlying the V.34 Recommendation, and the proposed 56 kbps modem are complex and typically require the use of high-end digital signal processors (DSPs).

One of the tasks of the modem is the task of equalizing incoming signals. Equalization is a technique used to compensate for distortion in analog signal lines. One of the distortions which is compensated for is Intersymbol Interference (ISI) which is described in more detail below. Prior to data communication, two communicating modems engage in a training sequence wherein the equalizers of the modem receivers are set to compensate for the quality of the analog signal line which links the modems. However, it has been found that training of the equalizer in the modem receiver is adversely affected if the connection between the receiving modem and the ultimate source of the received data includes both analog and digital signal lines. In particular, training is adversely affected by robbed bit signaling (RBS) introduced by the digital network into the digital data stream and by Digital Pad Attenuation (DPA) in the digital network.

RBS is a technique used in T1 network connections where the least significant bit of each nth data octet is replaced with a control bit by the network for control signalling. The frequency of robbed bits through a single T1 connection is one every sixth symbol. This "in-band" signalling is used to indicate things like "off-hook", "on-hook", "ringing", "busy signal", etc. RBS results in data impairment by changing transmitted bit values. When the data flowing through the network is digitized audio voice signals, a change in the least significant bit of some octets will introduce noise or distortion into the ultimate analog audio reproduction of the digitized voice signal. Nevertheless, this has been found to be acceptable for voice communications. When the data flowing through the network is digital data, however, RBS can have very serious consequences. For this reason, when data is sent through a T1 network connection, the least significant bit of each octet is often not used and the data is sent as seven bit symbols. This mitigates the RBS problem if the link between the two data units is completely digital, at the expense of reducing bandwidth of the link by one eighth. Since a T1 line carries twenty four 64 k channels, if one 64 k channel is used in a combined analog/digital link to a modem, conventional methods of eliminating RBS (i.e., using seven-bit symbols) would limit the maximum theoretical bandwidth of the connection to 56 k. This theoretical maximum would never be reached because of the presence of ISI and DPAs. Thus, the problem of RBS is a major obstacle to exploiting the maximum possible bandwidth of the combined analog and digital link; and if one wishes to exploit the entire bandwidth of the link, one must deal directly with the RBS problem.

The problem of RBS is even further complicated when the link between two data units includes several different digital legs such that the frequency of RBS is variable from one connection to another. In other words, if the link includes several different digital legs in which bits are robbed, the frequency of robbed bits can increase significantly.

During PCM modem training, it is impossible for the receiver to know whether a symbol has been impaired due to RBS. As a result, RBS can interfere with the equalizer training process and result in misadjustment of the equalizer. In turn, equalizer error will lead to improper and/or inadequate channel equalization, with the ensuing inability to perform other tasks such as channel measurements, etc. This will prevent the receiver from ever making proper compensations for ISI and DPAs.

Prior art FIG. 1, shows a simplified model of data transmission through a combined analog/digital link. At 11, binary data is provided in the digital part of the network and represents data from either an intrinsically binary source or an appropriately encoded (A-Law or µ-Law) analog quantity which is to be transmitted to the desired destination. The digital channel 13 carries binary data through one or more legs of the network. For purposes of FIG. 1, the digital channel can be characterized by the way it affects the binary data it carries relative to the original binary data presented at 11. The binary data carried by the digital channel 13 is at some point subjected to a digital-to-analog converter 15 which maps or translates binary data into an analog symbol format, such as a PCM level, suitable for transmission through an analog channel. The D/A conversion takes place at the rate of 1/T Hz, where T seconds is the duration of the symbol interval.

The analog signal is then provided to an analog channel 17 which carries the analog waveforms to a PCM modem 19. Due to its band-limited nature, the analog channel 17 introduces distortion or inter-symbol interference (ISI) as well as noise into the stream of analog waveforms it carries. ISI causes individual symbols to interact with one another, thereby distorting the signals.

The PCM modem 19 is coupled to the analog channel 17 and includes, among other things, a receiver 21 and an analog channel decoder 23. The receiver 21 receives the analog signals at its input, and includes means for synchronizing the receiver with the data source/transmitter. The receiver 21 also includes an equalizer which compensates for ISI distortion introduced in the analog channel. The equalized signal may then be translated by the analog channel decoder 23 and formatted into a binary data stream which is sent to a further destination 25 (e.g., a receiving computer).

As previously mentioned, the analog channel 17 introduces ISI which can significantly distort the signal at the receiver. Indeed, as a result of ISI, the symbol received at the receiver 21 at time instant kT is no longer determined by the transmitted symbol alone, but by a linear combination of a (theoretically possibly infinite) number of previously transmitted symbols. ISI can be a severe impairment for certain types of analog channels; especially those with spectral nulls in their magnitude response at various frequencies such as DC. The ISI problem of an analog channel is compounded by the fact that its impulse response is in general unknown. Thus, the ISI affects data symbols in an unknown way and seriously complicates the task of the receiver of correctly detecting the incoming symbols with a low probability of error. Noise added at the output of the analog channel compounds the difficulty of correcting for ISI.

Equalization of the signal to account for ISI and noise is absolutely essential for proper communications. Various equalizer filter architectures are known for such equalization. For example, an equalizer called a decision feedback equalizer (DFE) which is shown in prior art FIG. 2 is known to be effective in cases of severe amplitude distortion. As seen in FIG. 2, the DFE 30 includes a feed-forward finite impulse response (FIR) equalizer 32, first and second summers 34, 36, a decision block 38, and a feedback FIR equalizer 40. The feed-forward FIR provides a feedforward equalized component (Rff) to the summer 34 which is compared to the feedback equalized component (Rfb) provided by the feedback FIR 40 to provide an equalized estimated symbol (R). This estimated symbol (R) is provided to the decision block 38 as well as to the second summer 36. The decision block 38 generates a decision based on the equalized estimated symbol. The decision is fed back to the input of the feedback FIR equalizer 40, and is also sent to the second summer 36. The second summer 36 takes the difference between the estimated symbol and the output symbol, i.e., the error, and provides the error to the feed-forward FIR 32 and to the feedback FIR 40 in order to update the equalizer tap coefficients of the FIRs 32 and 40.

It should be appreciated that in the modem training period (prior to sending data), a decision block is not used. Rather, as seen in prior art FIG. 3, the decision block 38 is replaced with a reference generator 37 which generates a reference (known) sequence Tk. The reference sequence is compared at the second summer 36 to the estimated symbol R to provide an error e which is used as feedback in order to update the equalizer tap coefficients 31 (Cff) and 39 (Cfb) of the FIRs 32 and 40.

While the adaptive equalizer of FIGS. 2 and 3 is effective in compensating for ISI analog channel impairments, it does not account for digital channel impairments which can be present in PCM-type modem communications. In particular, the adaptive equalizers of the prior art are not effective in the presence of robbed bit signaling which causes octets in the training sequence to be translated into analog symbols which are different than what they would otherwise be. Similarly, octet transformation due to digital PAD attenuation is problematic in causing individual training symbols to be translated into different analog levels. The PAD impairment can occur with RBS, either before or after a bit is robbed.

It has been discovered that RBS, when present, occurs in a repeating frame of six bytes. Table 1, below, shows an example of an RBS Frame in which bytes 1, 3, and 4 are affected by RBS. It should be noted that, as mentioned above, RBS may be present in conjunction with DPAs and the robbed bit may occur before or after the pad.

TABLE 1

| |<---RBS Frame--------->| | | | | | | | | | |
|---|---|---|---|---|---|---|---|---|---|---|---|---|
| 0 | 1 | 2 | 3 | 4 | 5 | 0 | 1 | 2 | 3 | 4 | 5 | 0 |
|   | X |   | X | X |   |   | X |   | X | X |   |   |

SUMMARY OF THE INVENTION

It is therefore an object of the invention to provide methods and apparatus for mitigating the consequences of robbed bit signaling in a digital stream received by a PCM modem.

It is also an object of the invention to provide adaptive methods and apparatus for mitigating the consequences of robbed bit signaling in a digital stream received by a PCM modem.

It is another object of the invention to provide methods and apparatus for mitigating the consequences of robbed bit signaling which work in conjunction with conventional adaptive equalizers.

It is a further object of the invention to provide methods and apparatus for determining the pattern of RBS, if any, in the data stream, to remove the influence of RBS on the results of equalization, and to permit the adaptive equalizer to achieve substantially the same quality of channel equalization as when RBS is absent from the data stream.

In accord with these objects which will be discussed in detail below, the methods and apparatus of the present invention include providing an RBS estimator and decision modulator in conjunction with an adaptive equalizer. In a preferred embodiment, the adaptive equalizer is a conventional DFE having first and second summers and feedforward and feedback equalizers. The RBS estimator and decision modulator receives the error signals from the second summer in the DFE, receives either the equalized estimated signals R from the first summer of the DFE or remodulated symbols $T^{RM}k$, and outputs a gain correction signal $(1+g)$ which is applied to the output (Tk) of the reference generator to provide the remodulated symbols $(T^{RM}k)$. The remodulated symbols are provided to the feedback equalizer, to the second summer, and if desired, to the RBS estimate and decision modulator. The methods of the invention are based on the recognition that the effects of RBS can be detected in the amplitude modulation of the main training sequence stream. The modulation will occur in a periodic repetitive pattern of length $6*T$ where T is the symbol interval. Therefore, the invention applies a corrective gain to the decision in each time slot in a periodic manner having the same period $6*T$. More particularly, for each time interval $T_k$ over a period of $6*T$, the symbol present at the time interval is sampled and a respective corrective gain $g(6k-j)$ is applied to it, where j has the values 0 through 5. The gain applied to each of the six time slots is adaptively updated over a training period until each of the six gain coefficients is optimized.

According to a presently preferred embodiment of the invention, the adaptive decision remodulator calculates gain according to either:

$$gj_{(6(k+1)-j)} = gj_{(6k-j)} + \mu j * R_{(6k-j)} * e_{(6k-j)} \quad (1a)$$

or $$gj_{(6(k+1)-j)} = gj_{(6k-j)} + \mu j * T^{RM}_{(6k-j)} * e_{(6k-j)} \quad (1b)$$

where $gj_{(6(k+1)-j)}$ is a value of the $j^{th}$ decimated remodulation gain predicted for the time $6(k+1)-j$, $gj_{(6k-j)}$ is the current value of the $j^{th}$ decimated remodulation gain for the time $6k-j$, $\mu j$ is an adaptation constant for the $j^{th}$ gain, $R_{(6k-j)}$ is the current value of the equalized (estimated) symbol, and $e_{(6k-j)}$ is the current equalization error using the current $T^{RM}_{(6k-j)}$. These gain coefficients are applied sequentially corresponding to repeating frames of symbols T from the reference generator in order to generate remodulated values of T and error values e.

The main precondition for the engagement of the adaptive decision modulator is that the adaptive equalizer has first reached a certain level of equalization prior to introducing the adaptive decision modulator into the loop. For the type of impairments introduced by RBS, the steady state signal-to-noise ratio (SNR) obtained by the equalizer prior to introducing the adaptive decision modulator into the loop may be quite low (e.g., 21 db). Under these circumstances no further reduction in MSE (mean squared error) is possible unless the adaptive decision modulator is introduced into the loop. However, using the adaptive decision modulator of the invention, the final equalizer coefficient solution substantially eliminates the affects of RBS.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
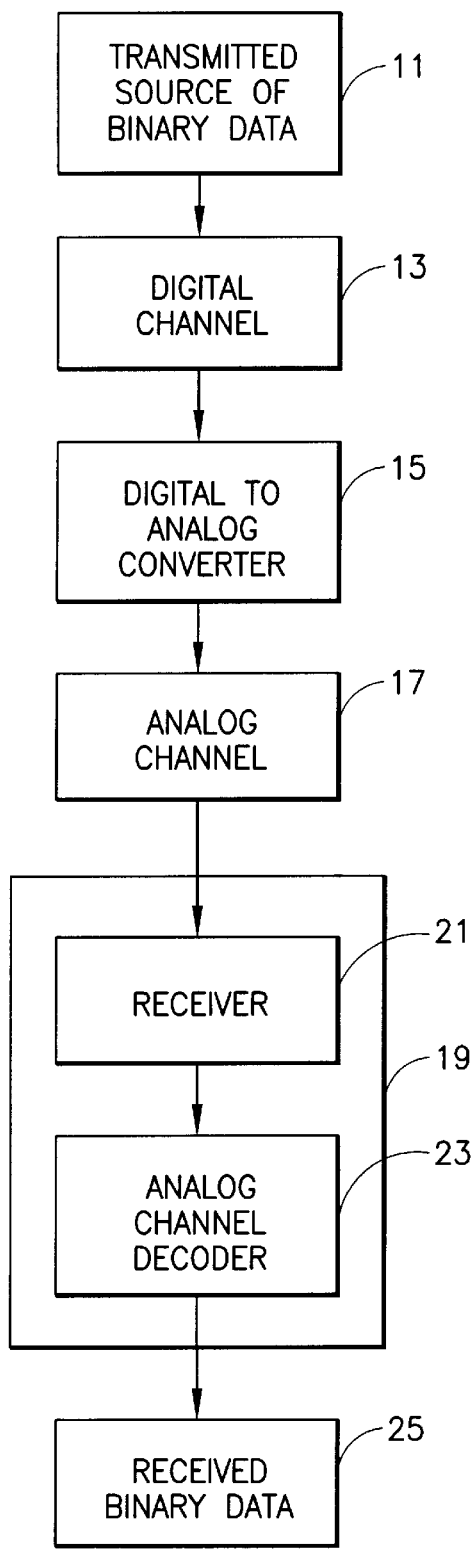
FIG. 1 is a schematic flow chart of the downstream flow of data a prior art PCM modem from a digital source where the link between the upstream source and the downstream modem includes both digital and analog network channels.
Figure 2:
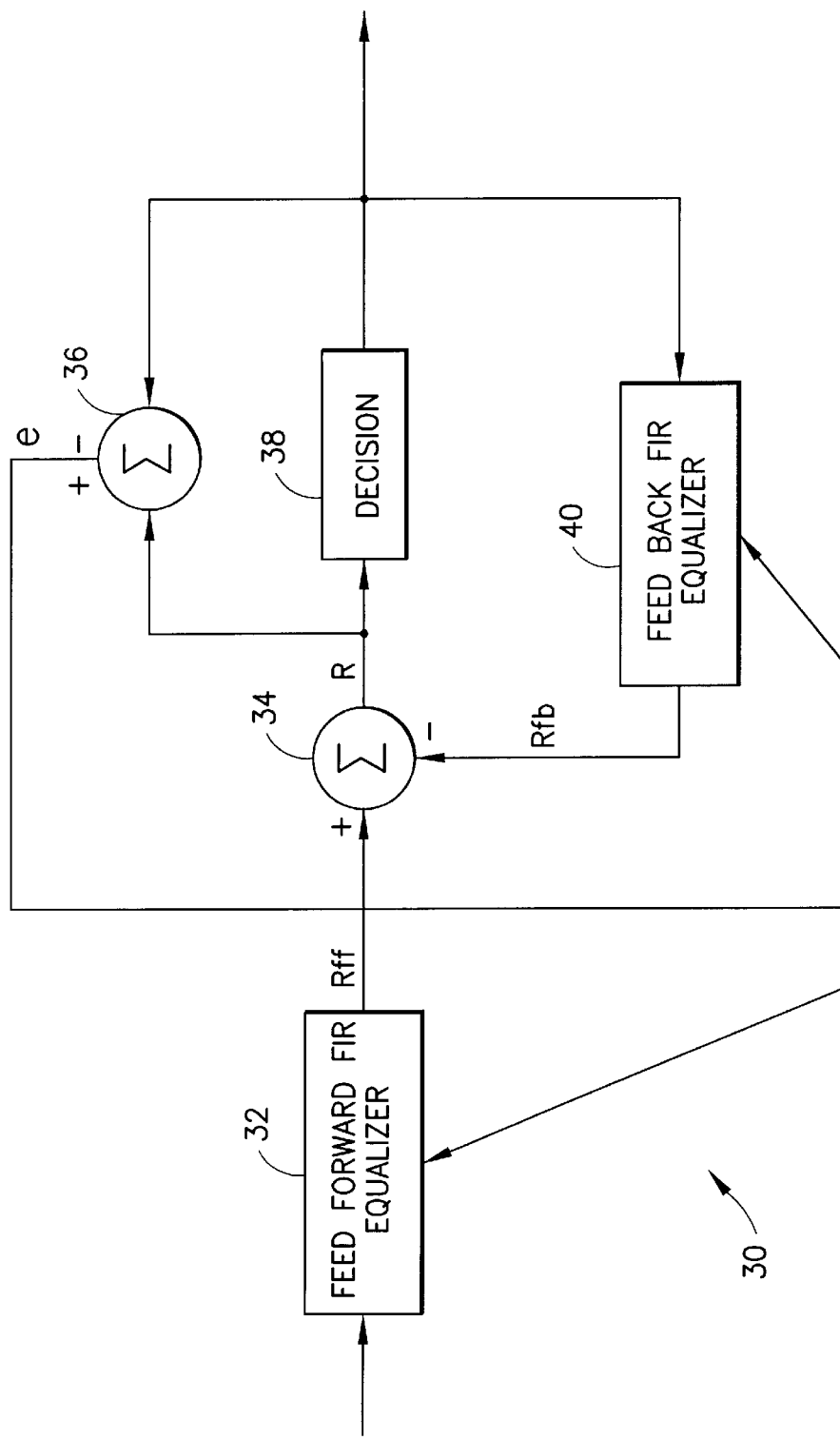
FIG. 2 is a schematic block diagram of a prior art DFE in operation after training.
Figure 3:
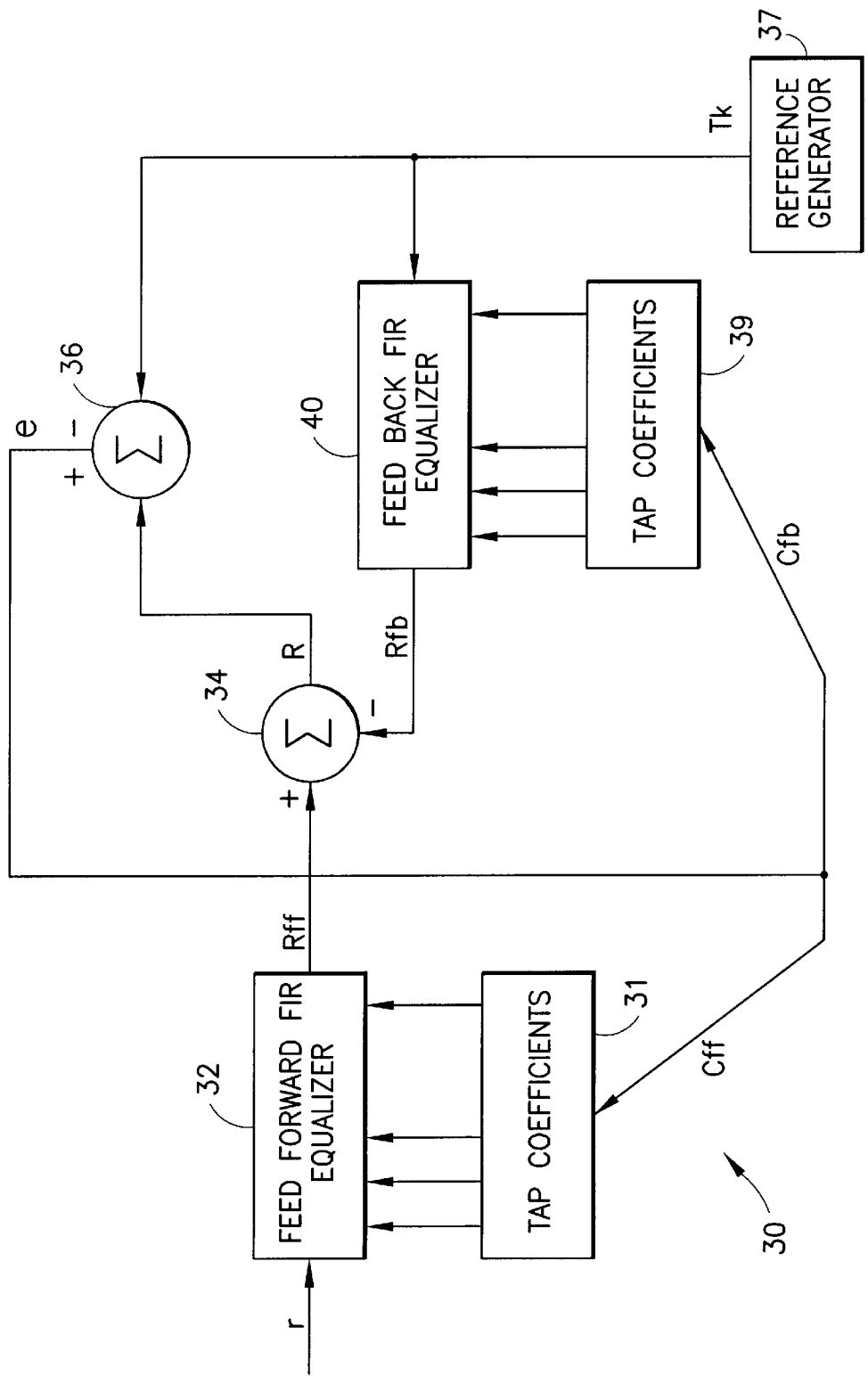
FIG. 3 is a schematic block diagram of a prior art DFE in operation during training.
Figure 4:
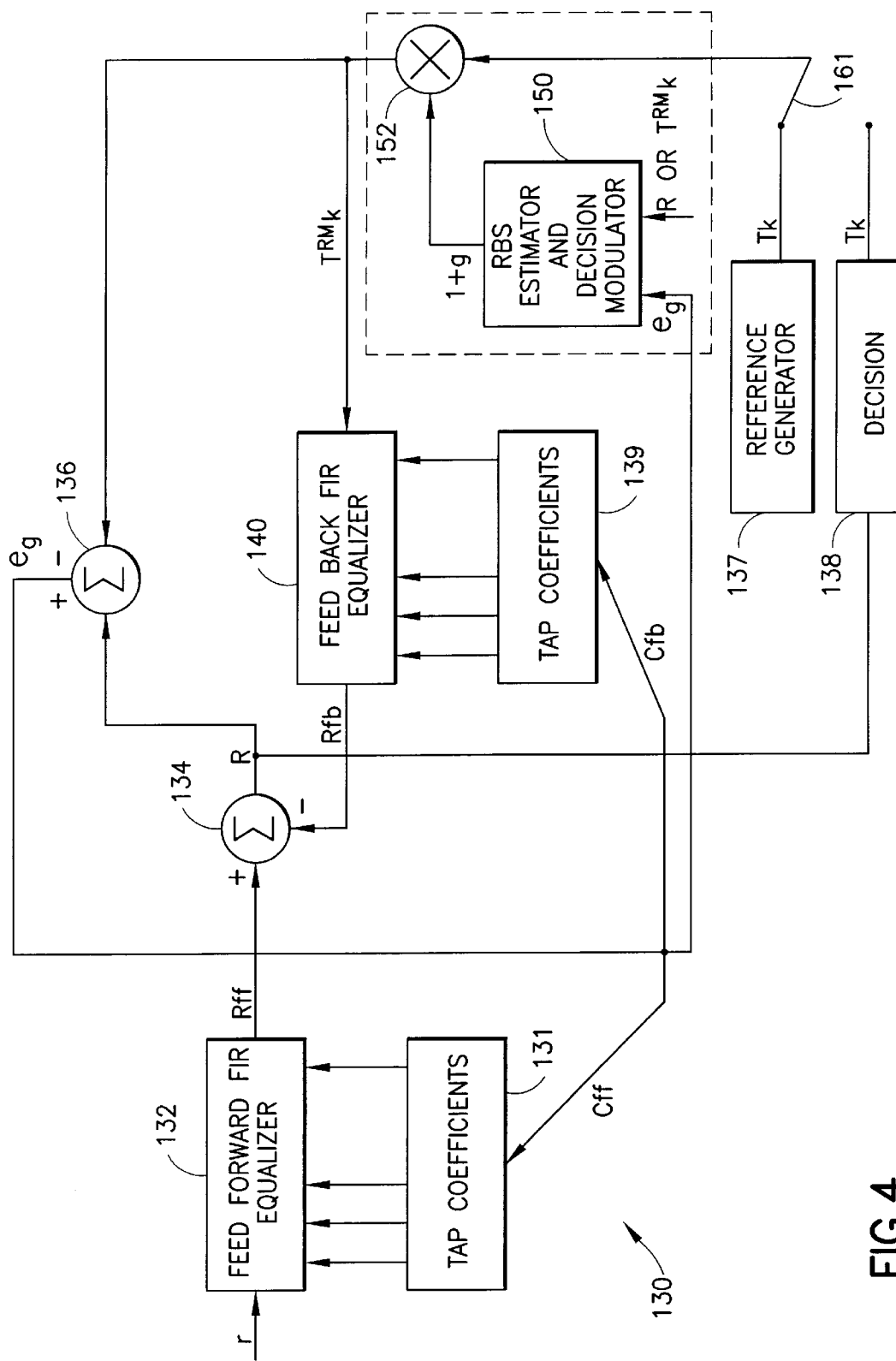
FIG. 4 is a schematic block diagram of a DFE with RBS correction according to the invention.

Referring now to FIG. 4, a decision feedback equalizer 130 with adaptive decision correction according to the preferred embodiment of the invention includes some of the components of a prior art DFE which are indicated with reference numerals similar to those shown in FIGS. 2 and 3 but incremented by 100. Thus, the DFE 130 includes a feed-forward finite impulse response (FIR) equalizer 132, first and second summers 134, 136, a reference generator 137 and decision block 138, and a feedback FIR equalizer 140. The feed-forward FIR provides a feedforward equalized component (Rff) to the summer 134 which is compared to the feedback equalized component (Rfb) provided by the feedback FIR 140 to provide an equalized estimated symbol (R). This estimated symbol (R) is provided to the second summer 136 which is also coupled (via multiplier 152) to the output of a reference generator 137 which generates a reference (known) sequence (Tk). In accord with the invention, periodic gain coefficients $(1+g)$ are applied at multiplier 152 to the sequence (Tk) to provide remodulated symbols $(T^{RM}k)$ which are fed as a sequence to the summer 136. These remodulated symbols $(T^{RM}k)$ are also fed to the feedback FIR 140. The remodulated reference sequence $(T^{RM}k)$ is compared at the second summer 136 to the estimated symbol (R) to provide an error $(e_g)$ which is used as feedback in order to update the equalizer tap coefficients 131 (Cff) and 139 (Cfb) of the FIRs 132 and 140. According to the invention, the error $(e_g)$ is also used as an input to the RBS estimator and decision modulator 150 (which also receives an input (R) from summer 134 or an input $T^{RM}k$ from multiplier 152).

Once the training has been accomplished, instead of utilizing the reference generator 137 to provide the sequence Tk, a decision block 138 is used to generate the sequence Tk. Thus, switch 161 is used to switch from the reference generator 137 to the decision block 138. The decision block 138 utilizes the equalized estimated symbol (R) in making its decision as is well known in the art.

Figure 5:
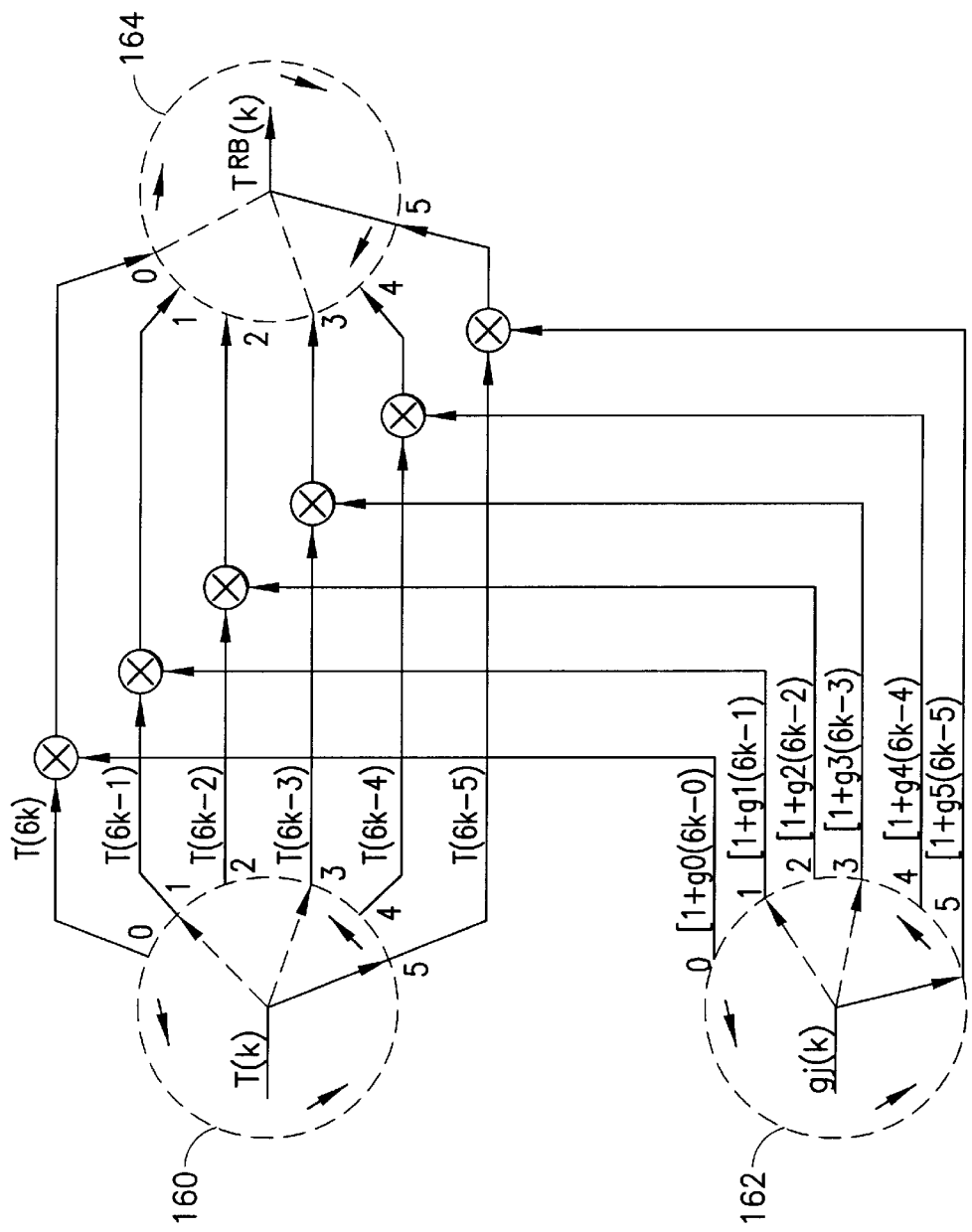
FIG. 5 is a schematic block diagram of a periodic gain generator according to the invention.

In order to better understand the basic operations of the RBS estimator and decision modulator 150, the periodic application of gain $gj(k)$ to symbols Tk to obtain remodulated symbols $T^{RM}k$ can be illustrated as a synchronously rotating commutator as shown in FIG. 5. The commutator diagram shown in FIG. 5 shows three synchronously rotating switches 160, 162, 164 each of which has six positions $j=5,4,3,2,1,0$, each position referring to a time slot in the $6*T$ period of an unknown RBS pattern. As illustrated in FIG. 5, all of the switches are at the position $j=5$ when the incoming stream of training symbols Tk is at the start of a six symbol RBS pattern or frame. Thus, the symbol sampled at switch 160 when it is in the first position $j=5$ is labelled $T(6k-5)$.

The gain coefficient applied to this symbol is selected at switch 162 which is synchronously at the same j=5 position. The gain coefficient at this position is labelled [1+g5(6k−5)] and represents the gain coefficient which will be repeatedly applied to each T(6k−5). Switch 164 represents the remodulated symbols $T^{RM}k$, each of which is calculated by multiplying the respective symbol Tj(k) by the respective gain coefficient gj(k). It will therefore be understood that the RBS estimator and decision modulator 150 will generate a repeating pattern of six gain coefficients which are synchronized with the stream of training symbols in order to adjust the amplitude of the locally generated training symbols to match the RBS-altered amplitude of the symbols in the received signal stream R. When the locally generated training symbols are so remodulated, the DFE is permitted to correctly adjust the tap coefficients by comparing the estimated signal R with the remodulated reference signal $T^{RM}k$ which has now been adjusted to compensate for the effects of RBS on the estimated signal R. Therefore, the tap coefficients for the symbols which have been affected by RBS are set differently than they would have been set were it not for the remodulation of the locally generated training symbols.

The decision modulator 150, according to the invention, operates adaptively to estimate the RBS pattern and assign the appropriate gain coefficients to each slot in the repeating RBS frame. As mentioned above, according to a presently preferred embodiment of the invention, the adaptive decision remodulator calculates gain according to $$gj_{(6(k+1)-j)} = gj_{(6k-j)} + \mu j^* R_{(6k-j)} {}^* e_{(6k-j)} \quad (1a)$$

or $$gj_{(6(k+1)-j)} = gj_{(6k-j)} + \mu j^* T^{RM}{}_{(6k-j)} {}^* e_{(6k-j)} \quad (1b)$$

where $gj_{(6(k+1)-j)}$ is a value of the $j^{th}$ decimated remodulation gain predicted for the time 6(k+1)−j, $gj_{(6k-j)}$ is the current value of the $j^{th}$ decimated remodulation gain for the time 6k−j, $\mu j$ is an adaptation constant for the $j^{th}$ gain, $R_{(6k-j)}$ is the current value of the equalized (estimated) symbol, and $e_{(6k-j)}$ is the current decision error using the current $T^{RM}{}_{(6k-j)}$. The adaptation constant $\mu j$ is appropriately chosen as is known in the art. These gain coefficients are applied iteratively to repeating frames of symbols Tk from the reference generator in order to generate remodulated values of $T^{RM}k$ according to $$T_{(6k-j)}{}^{RM} = T_{(6k-j)} {}^*[1+gj(6k-j)] \quad (2)$$

Each time a symbol Tk is remodulated, a new error e is generated at the second summer 136 in FIG. 4 according to $$e_{(6k-j)} = R_{(6k-j)} - T_{(6k-j)}{}^{RM} \quad (3)$$

Each error e is used in equation (1) above to recalculate the gain coefficients for each $j^{th}$ slot in the RBS frame. The interaction of the equations (1a) or (1b) through (3) is shown diagrammatically in FIGS. 6a and 6b which represent the application of the equations to each $j^{th}$ slot in the RBS frame.

Figure 6A:
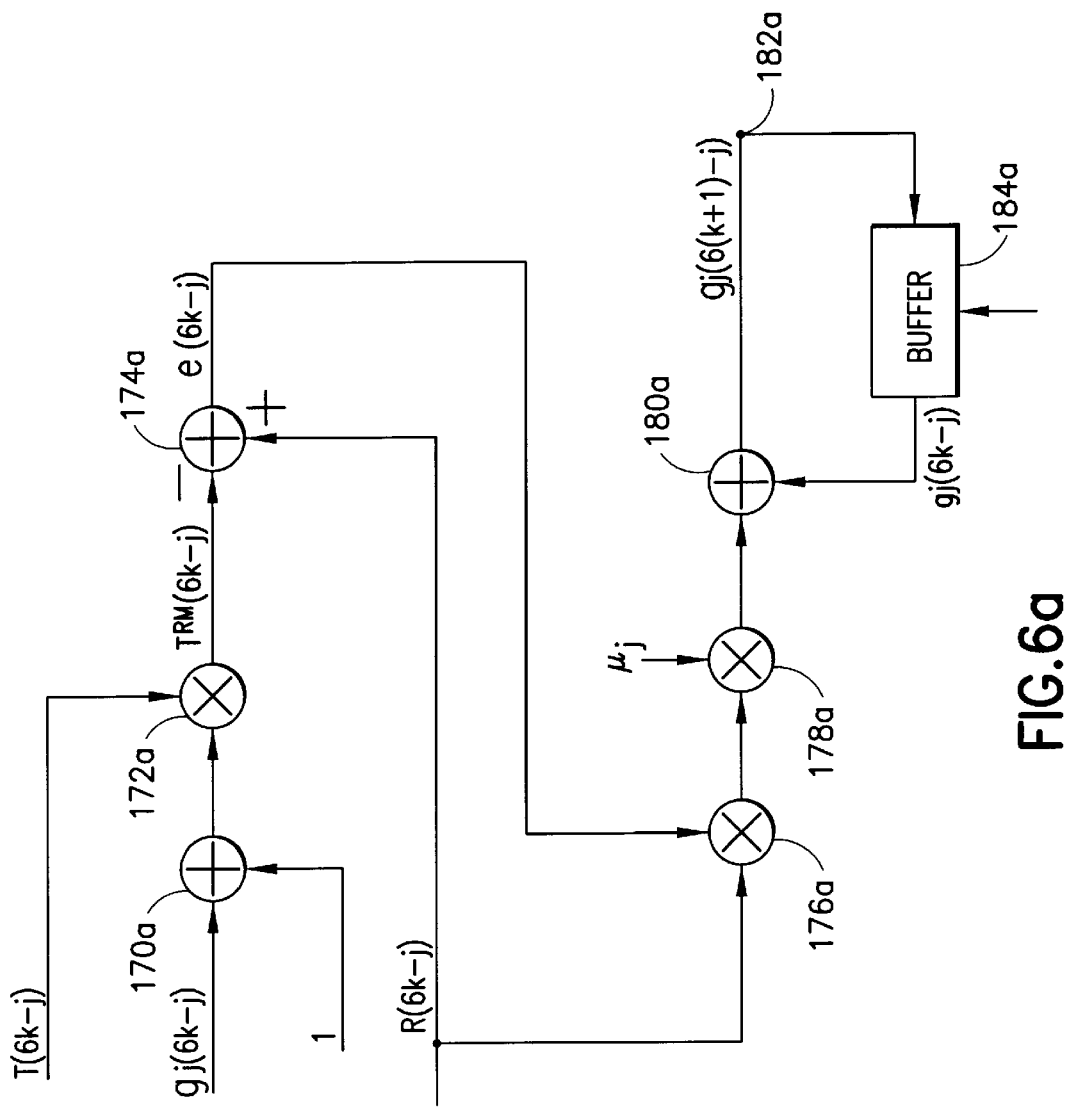
FIGS. 6a and 6b are schematic block diagrams of alternative embodiments of one branch of an adaptive decision modulator according to the invention.

Turning now to FIG. 6a, according to a first embodiment, the gain (g) for the $j^{th}$ slot of the RBS frame is added to "1" at 170a to provide a gain coefficient which is multiplied by the current training symbol (T) at 172a to produce a remodulated training symbol ($T^{RM}$) which is subtracted from the equalized symbol (R) at 174a. The "summing" (which takes place at the summer 136 in FIG. 4) produces the decision error (e) which is used to calculate the predicted gain for the next iteration of the $j^{th}$ slot of the RBS frame. The error (e) is multiplied by the symbol (R) at 176a and this product is multiplied by the adaptation constant ($\mu$) for this $j^{th}$ slot at 178a. The product created at 178a is then added to the present gain (g) at 180a to produce the gain for the next occurrence of this $j^{th}$ slot in the RBS frame at 182a. The accumulated set of six gains is stored at a buffer 184a (such as a FIFO) which produces the current gain for summation at 170a and 180a based on the last predicted gain which is provided at 182a.

Figure 6B:
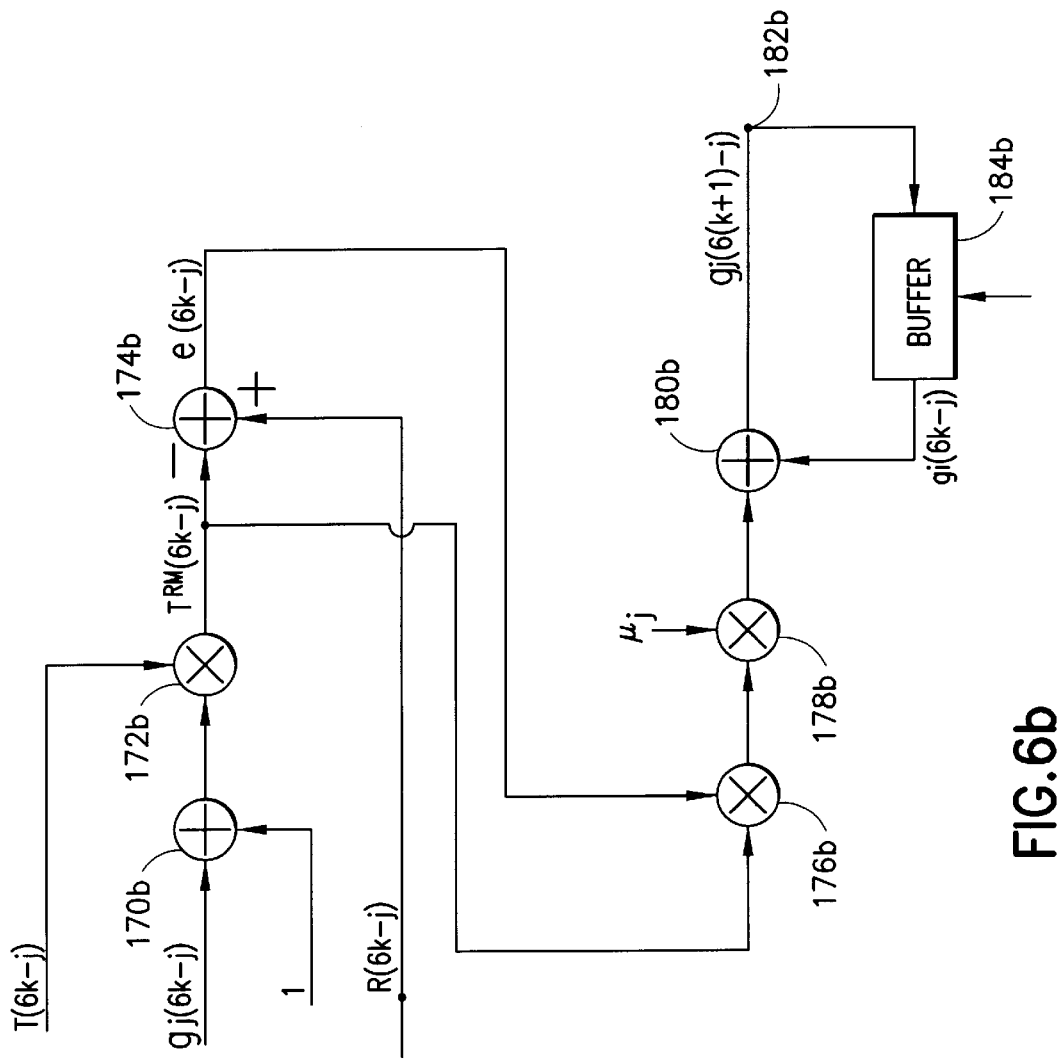

Turning to FIG. 6b, in an alternative preferred embodiment, the gain (g) for the $j^{th}$ slot of the RBS frame is added to "1" at 170b to provide a gain coefficient which is multiplied by the current training symbol (T) at 172b to produce a remodulated training symbol ($T^{RM}$) which is subtracted from the equalized symbol (R) at 174b. The "summing" (which takes place at the summer 136 in FIG. 4) produces the decision error (e) which is used to calculate the predicted gain for the next iteration of the $j^{th}$ slot of the RBS frame. The error (e) is multiplied by the remodulated symbol ($T^{RM}{}_{6k-j}$) at 176b and this product is multiplied by the adaptation constant ($\mu$) for this $j^{th}$ slot at 178b. The product created at 178b is then added to the present gain (g) at 180b to produce the gain for the next occurrence of this $j^{th}$ slot in the RBS frame at 182b. The accumulated set of six gains is stored at a buffer 184b (such as a FIFO) which produces the current gain for summation at 170b and 180b based on the last predicted gain which is provided at 182b.

It will be appreciated that when the decision modulator is initialized, there are no gain values available for application to the summer 170a or 170b. According to the presently preferred embodiment of the invention, the buffer 184a or 184b is initially filled with six zeros. It will also be appreciated that the operations shown in FIG. 6 are carried out independently for each of the six slots (j=1, 2, 3, 4, 5, 0) in the RBS frame. It will further be appreciated that these operations are carried out for k=n iterations of the RBS frame until the stream of symbols (R) has been adequately equalized. It will be understood that each slot j in the repeating frame may have a different gain coefficient. From frame to frame, however, the repeating gain coefficient applied to each particular slot j should become relatively constant. Thus, after iteratively adjusting slot gains for n frames, the system should equalize with a constant repeating pattern of gain coefficients which may then be applied to the output of the decision block.

It should be appreciated that the main precondition for the engagement of the adaptive decision modulator is that the equalizer has first reached a certain level of equalization prior to introducing the adaptive decision modulator into the loop (i.e., another switch, not shown, may be provided and used to bypass the RBS estimator and decision modulator). For the type of impairments introduced by RBS, the steady state signal-to-noise ratio (SNR) obtained by the DFE prior to introducing the adaptive decision modulator into the loop may be quite low (e.g., 21 db). Under these circumstances no further reduction in MSE (mean squared error) is possible unless the adaptive decision modulator is introduced into the loop. However, using the adaptive decision modulator of the invention, the final equalizer coefficient solution substantially eliminates the affects of RBS.

Figure 7:
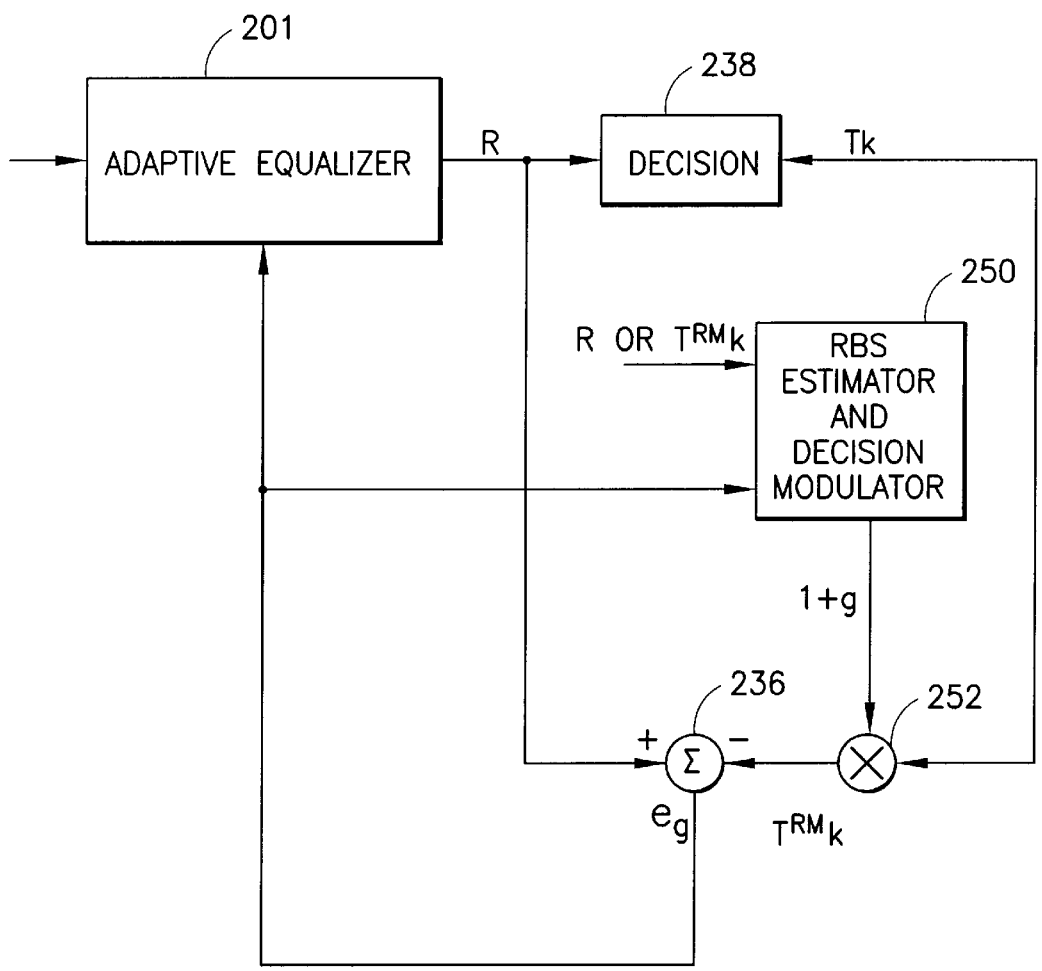
FIG. 7 is a schematic block diagram of a generic adaptive equalizer with RBS correction according to the invention.

Turning to FIG. 7, the PCM modem equalizer of the invention is shown using a more generic "adaptive equalizer" 301 instead of a DFE. In FIG. 7, components which are similar to those shown in FIG. 4 are incremented by 100. Thus, incoming signals are received by the adaptive equalizer 201 which outputs an equalized estimated symbol (R). The estimated symbol R is fed to a decision block 238, to a summer 236, and, according to one embodiment, to the RBS estimator and decision modulator 250. From the estimated symbol R, the decision block 238 generates a sequence of output decisions Tk (it being appreciated that during training, instead of the decision block 238 being utilized, a reference generator is utilized to provide Tk). The output decisions Tk are multiplied by the output (1+g) of the RBS estimator and decision modulator 250 to provide remodulated symbols $T^{RM}_k$. Differences between the remodulated symbols ($T^{RM}_k$) and the estimated symbols (R) are taken at the summation block 236 to generate error values ($e_g$), and the error values are fed back to the adaptive equalizer 201 and the RBS estimator and decision modulator 250. As can be seen from FIG. 7 (as well as FIGS. 4–6), the RBS estimator and decision modulator 250 utilizes the error values ($e_g$) as well as either the estimated symbols (R) or the remodulated symbols $T^{RM}k$ in generating a gain (g).

There have been described and illustrated herein a PCM modem equalizer with adaptive compensation for robbed bit signalling. While particular embodiments of the invention have been described, it is not intended that the invention be limited thereto, as it is intended that the invention be as broad in scope as the art will allow and that the specification be read likewise. Thus, while the invention has been described as being typically implemented in a DSP of the modem, it will be appreciated that different hardware and/or software can be utilized. Indeed, the invention can be implemented as part of a "soft-modem". Also, while particular block diagrams were provided, it will be appreciated that the invention can be implemented using different equivalent blocks. Thus, instead of a 6*T FIFO buffer, other types of buffers could be utilized. In fact, in certain circumstances, different buffers will be required. For example, in certain circumstances, particulars of the network cause an asymmetry in the translation of positive levels and negative levels. Where this asymmetry is present, separate positive and negative corrective gains must be determined for each of the six slots, thereby requiring effectively twelve gain adjustments (g) to be determined. Thus, the buffer must be capable of storing twelve values and being accessed upon demand, depending upon whether a positive or negative gain adjustment is required for the particular incoming value. Similarly, in certain networks, the value of the robbed bit in even numbered RBS frames is not equal to the value of the robbed bit in odd numbered frames. In this case, corrective gains must be assigned separately to even and odd numbered frames, thereby requiring effectively twelve gain adjustments to be determined. Of course, where the network has both the asymmetry and the changing robbed bit values present, twenty-four corrective gain adjustments must be determined and stored. It will therefore be appreciated by those skilled in the art that yet other modifications could be made to the provided invention without deviating from its spirit and scope as so claimed.

We claim:

1. A PCM modem equalizer, comprising:
   a) reference symbol generator means for locally generating a sequence of training symbols;
   b) receiver means for receiving a sequence of remotely generated training symbols;
   c) an RBS estimator and decision modulator means coupled to said reference symbol generator means and for remodulating said locally generated training symbols by applying a pattern of gain coefficients to said locally generated training symbols; and
   d) an adaptive equalizer means coupled to both said receiver means and said RBS estimator and decision modulator means, said adaptive equalizer means for generating an equalized estimated symbol, and said adaptive equalizer means having coefficients which are adapted in response to comparisons between said equalized estimated symbols and said remodulated locally generated training symbols.

2. A PCM modem equalizer according to claim 1, wherein:
   said pattern of gain coefficients are applied over a period of six symbols.

3. A PCM modem equalizer according to claim 1, wherein:
   said RBS estimator and decision modulator means for determining 6n gain coefficients, where n is an integer greater than zero.

4. A PCM modem equalizer according to claim 3, wherein:
   said RBS estimator receives (i) said comparisons between said equalized estimated symbols and said remodulated locally generated training symbols, and (ii) at least one of said equalized estimated symbols and said remodulated locally generated training symbols.

5. A PCM modem equalizer according to claim 1, wherein:
   said RBS estimator and decision modulator includes means for adaptively remodulating said locally generated training symbols over time.

6. A PCM modem equalizer according to claim 1, wherein:
   said RBS estimator and decision modulator includes means for determining a pattern of RBS impairment of said remotely generated training symbols.

7. A PCM modem equalizer according to claim 6, wherein:
   said pattern of gain coefficients is based on said pattern of RBS impairment.

8. A PCM modem equalizer according to claim 1, wherein:
   said adaptive equalizer means comprises a decision feedback equalizer.

9. A PCM modem, comprising:
   a) a receiver for receiving an analog signal from a remote source; and
   b) an analog channel decoder coupled to said receiver for converting said analog signal into a digital signal, wherein
      said receiver includes an equalizer having
         ii) reference symbol generator means for locally generating a sequence of training symbols;
         ii) means for receiving a sequence of remotely generated training symbols via said receiver;
         iii) an RBS estimator and decision modulator means coupled to said reference symbol generator means and for remodulating said locally generated training symbols by applying a pattern of gain coefficients to said locally generated training symbols; and
         iv) an adaptive equalizer means coupled to both said receiver means and said RBS estimator and decision modulator means, said adaptive equalizer means for generating an equalized estimated symbol, and said adaptive equalizer means having coefficients which are adapted in response to comparisons between said equalized estimated symbols and said remodulated locally generated training symbols.

10. A PCM modem according to claim 9, wherein:

said pattern of gain coefficients is applied over a period of six symbols.

11. A PCM modem according to claim 9, wherein:

said RBS estimator and decision modulator means for determining 6n gain coefficients, where n is an integer greater than zero.

12. A PCM modem according to claim 11, wherein:

said RBS estimator receives (i) said comparisons between said equalized estimated symbols and said remodulated locally generated training symbols, and (ii) at least one of said equalized estimated symbols and said remodulated locally generated training symbols.

13. A PCM modem according to claim 9, wherein:

said RBS estimator and decision modulator includes means for adaptively remodulating said locally generated training symbols over time.

14. A PCM modem according to claim 9, wherein:

said RBS estimator and decision modulator includes means for determining a pattern of RBS impairment of said remotely generated training symbols.

15. A PCM modem according to claim 14, wherein:

said pattern of gain coefficients is based on said pattern of RBS impairment.

16. A PCM modem according to claim 9, wherein:

said adaptive equalizer means comprises a decision feedback equalizer.

17. A method for training a PCM modem, comprising:

a) receiving a sequence of remotely generated training symbols;

b) applying the sequence of remotely generated training symbols to an adaptive equalizer which provides a sequence of equalized estimated signals (R) therefrom;

c) generating a sequence of remodulated locally generated training symbols $T^{RM}_k$ by determining a gain coefficient; and d) comparing said equalized estimated signals with respective remodulated locally generated training signals to generate feedback signals ($e_g$), and using said feedback signals to adjust said adaptive equalizer.

18. A method according to claim 17, wherein:

said adaptive equalizer is adjusted over a period of six symbols.

19. A method according to claim 17, wherein:

said determining a gain coefficient includes determining 6n gain coefficients, where n is an integer greater than zero.

20. A method according to claim 19, wherein:

said generating a sequence further includes providing local training signals to which said gain coefficients are applied to generate said remodulated locally generated training signals.

21. A method according to claim 17, wherein:

said generating a sequence includes utilizing said sequence of equalized estimated signals and said feedback signals.

* * * * *